United States Patent Office
3,193,441
Patented July 6, 1965

3,193,441
LAMINATED ARTICLES AND METHOD OF
MAKING SAME
Kenneth A. Schafer, Cedarburg, Wis., assignor to Freeman
 Chemical Corporation, Port Washington, Wis., a corporation of Delaware
Filed Aug. 28, 1961, Ser. No. 134,253
11 Claims. (Cl. 161—159)

This invention relates to laminated articles fabricated from thermosetting resinous compositions and foamed resinous sheets having open, connected cells.

The present laminated articles resemble leather, i.e., they are tough, flexible and possess a fine grain surface appearance.

According to this invention, laminated articles are prepared by impregnating a thermosetting resinous composition in liquid form into a resilient sheet of flexible foamed polyurethane having open, connected cells. The impregnated sheet of foamed polyurethane is compressed between molding plates. The thermosetting resinous composition is cured to a hardened thermoset condition while the impregnated sheet of foamed polyurethane is maintained under compression.

When the thermosetting resinous composition has cured, the molding plates are separated and the present laminated article is recovered. The cured thermoset resinous composition completely fills the void spaces within the compressed foamed polyurethane and retains the foamed polyurethane in its compressed form in the resulting article.

Foamed resins

The foamed resinous material of this invention, as heretofore mentioned, is preferably foamed polyurethane having open, connected cells. Other materials which have been investigated have been found to be undesirable for want of one or more of the following features:

The foamed resin must possess:
 (1) Open-celled configuration;
 (2) Ready compressibility;
 (3) Wettability with the liquid thermosetting resinous composition;
 (4) Flexibility;
 (5) In some instances, the ability to be prepared in colorless compositions where clear laminated articles are desired.

Polyurethane foam is eminently satisfactory in the above-listed properties where the thermosetting resinous composition is unsaturated polyester resin or epoxy resin.

The preferred foamed resin has cells of substantially uniform diameter in the range of 0.001 to 0.5 inch. The material is provided in sheet form having a thickness from about 0.05 to 2.0 inches in its uncompressed form. Such sheets may be readily compressed to a minor fraction of their uncompressed thickness during the laminating process.

The cells of the foamed resin must be open and connected. Polyurethane foams having open, connected cell structures have been described in U.S. Patent 2,961,710 and Canada Patent 620,248. The cell-wall breakdown described in these references is accomplished through the action of organic solvents and inorganic reagents acting upon the customary closed-cell polyurethane foams.

In some instances polyurethane foams of the polyether variety may possess inherently weak cell walls which will break down satisfactorily during the laminating process. Usually with polyurethane foams of the polyester variety, pretreatment of some sort to break down the cell wall structures will be required.

Thermosetting resins

Unsaturated polyester resins are well-known in the art as a thermosetting resinous composition. Such resinous compositions are widely utilized in industry. The unsaturated polyester resins usually are solutions of unsaturated polyesters in a polymerizable monomeric solvent such as styrene, vinyl toluene, acrylates, methacrylates, and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride, and the like. The unsaturated polyester resin is dissolved in a polymerizable monomer to prepare the customary resinous compositions of the trade. Usually from about 20 to 50 parts by weight of styrene and 80 to 50 parts by weight of the unsaturated polyester are mixed to formulate a typical unsaturated polyester resinous composition. Such compositions form three-dimensional (thermoset) polymeric bonds without substantial shrinkage through application of heat in the presence of a suitable polymerization catalyst such as benzoyl peroxide. Customarily the thermosetting resinous compositions contain suitable pigmentation to present an opaque surface when cured. Without pigmentation, the resinous compositions will cure to a clear or translucent material. The precise formulation of the unsaturated polyester resinous composition forms no part of the present invention.

In the preferred embodiment of this invention, the thermosetting resinous composition is a flexible unsaturated polyester resin. The preparation of flexible unsaturated polyester resinous compositions usually involves the use of relatively long chain glycols as one of the esterification reactants together with a relatively minor quantity of ethylenically unsaturated dicarboxylic acid or acid anhydride.

A typical formulation of a flexible unsaturated polyester resinous composition would include perhaps 10 mols of a relatively long chain glycol such as diethylene glycol, propylene glycol, dipropylene glycol (rather than the relatively short chain ethylene glycol) together with about 2 to 5 mols of ethylenically unsaturated dicarboxylic acid or acid anhydride (such as maleic anhydride) and 8 to 5 mols of a dicarboxylic acid or acid anhydride free of ethylenic unsaturation (such as phthalic acid or phthalic anhydride). The resulting polyester would be dissolved in an ethylenically unsaturated monomeric solvent so that the resulting solution would contain from 20 to 50 percent by weight of the monomeric solvent such as styrene, vinyl toluene and the like.

The principal object of this invention is to prepare laminated articles from foamed polyurethane having open, connected cells together with a flexible thermosetting resinous composition. A further object of this invention is to prepare laminated articles which resemble leather in many physical properties.

A still further object of this invention is to prepare laminated articles which possess a leathery grain surface presentation.

An even further object of this invention is to prepare laminated articles having a leathery grain which are relatively translucent.

These and other objects and advantages of this invention will become apparent from the following detailed description by reference to the accompanying drawings in which.

Figure 1:
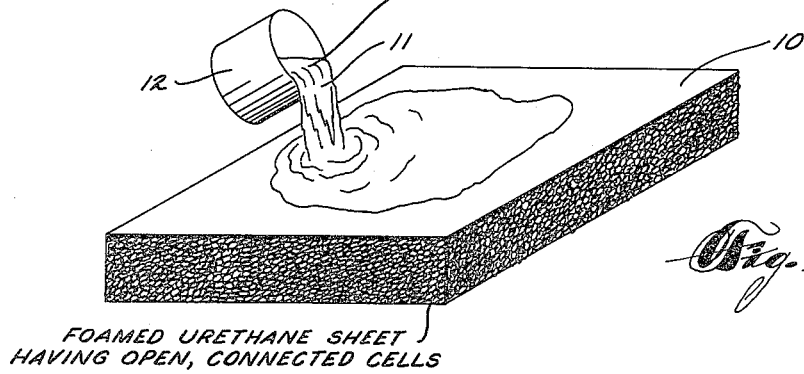
FIGURE 1 is a perspective illustration of a sheet of foamed polyurethane impregnated with a thermosetting resinous composition.
Figure 2:
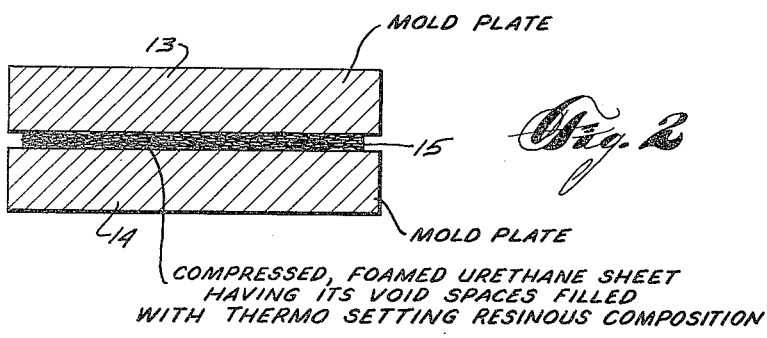
FIGURE 2 is a cross-section illustration of the impregnated foamed polyurethane of FIGURE 1 compressed between a pair of molding plates.
Figure 3:
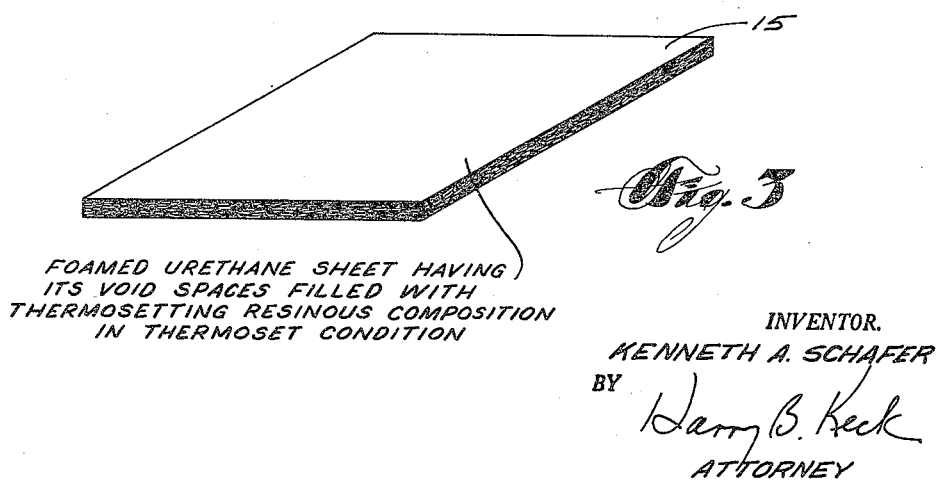
FIGURE 3 is a perspective illustration of the laminated article resulting from the present laminating process carried out with the foamed polyurethane sheet of FIGURE 1.

Referring to FIGURE 1, there is illustrated a sheet 10 of foamed polyurethane having open, connected cells. A supply 11 of non-foaming thermosetting resinous composition in liquid form is provided from a source 12. The sheet 10, impregnated with the thermosetting resinous composition supply 11 is compressed between molding plates 13, 14 as seen in FIGURE 2 and the thermosetting resinous composition is cured while the sheet 10 is maintained under compression. Upon curing of the thermosetting resinous composition, the resulting laminated article 15 has the reduced thickness as seen in FIGURE 3. The compressed sheet 10 retains its compressed configuration after the thermosetting resinous composition supply 11 has cured within the void spaces of the foamed polyurethane. The sheet 10 in the resulting article is substantially flattened from its initial uncompressed thickness and is substantially uniformly disposed throughout the article.

Where the thermosetting resinous composition supply 11 is a clear (i.e., unpigmented) resinous composition, the resulting laminated article 15 is translucent. If the foamed polyurethane sheet 10 was initially neutral in color, the resulting article may be essentially clear since the neutral colored foamed polyurethane sheet will essentially "disappear" in the product 15.

If, on the other hand, the foamed resinous sheet 10 is colored and a clear supply 11 of thermosetting resinous composition is provided, the product will be essentially opaque when viewed by reflected light and essentially translucent when viewed by transmitted light.

Where the thermosetting resinous composition supply 11 is opaque, the resulting laminated article 15 will possess an appearance like that of fine grain leather according to the cell size of the foamed polyurethane sheet 10. With relatively small size cells, the foamed polyurethane will achieve the fine grained surface presentation. With relatively large size cells, the foamed polyurethane will achieve a generally marbleized surface presentation with the thermosetting resinous composition appearing between the unbroken, cell-wall elements of the foamed polyurethane which are in abutment with the surfaces of the molding plates 13, 14 in the laminating process.

The resulting surface presentations are limitless. Where the thermosetting resinous composition has one coloration (e.g., white, gray, buff and the like) and the foamed polyurethane has another coloration (e.g., red, green, blue, and the like), the resulting surface presentation will be essentially the coloration of the resinous composition with an intermixture of the coloration of the foamed polyurethane.

By utilizing the flexible varieties of the thermosetting resinous compositions, the resulting laminated article 15 possesses the properties of leather, and can be substituted for leather in many utilizations. In the translucent embodiments, the present laminated articles can find utility in situations where leather is not useful.

By virtue of the extreme flexibility of foamed polyurethane having open, connected cells, the present laminated articles can be provided with compound curvatures without the appearance of laps or folds in the product. The present laminated articles can be strengthened by the inclusion of suitable fibrous materials in the laminated article, e.g., cotton threads, nylon threads, and the like.

*Example*

A laminated article was prepared from four sheets of gray-colored foamed polyurethane having open, connected cells. The foamed polyurethane was of the polyester variety having its cells opened by a treatment as described in Canada Patent 620,248.

Each of the four sheets had a normal, uncompressed thickness of 0.25 inch. The thermosetting resinous composition contained a polyester formed from 10 mols diethylene glycol, 3 mols maleic anhydride and 7 mols phthalic anhydride. Seven parts by weight of the unsaturated polyester were dissolved in three parts by weight of styrene to formulate the unsaturated polyester resinous composition.

The clear composition was applied to the four sheets of the foamed polyurethane which were then compressed as a sandwich assembly between two flat plates of steel until the thermosetting resinous composition was cured. Upon cure, the resulting laminated article was a sheet which appeared like leather, i.e., the sheet has a grain surface presentation and was tough, yet flexible. Because the unsaturated polyester resinous composition in this example was clear, i.e., unpigmented, the resulting laminated article was clear when viewed from transmitted light yet was opaque when viewed by reflected light because of the gray coloration of the foamed polyurethane sheets. The foamed polyurethane sheets were colored gray through suitable dye-additives in their fabrication process.

Other suitable unsaturated polyester resinous compositions which create acceptable leather-like laminated articles include:

A. Ten mols propylene glycol; 2 to 7 mols maleic anhydride; 8 to 3 mols adipic acid or succinic acid (the total mols of acid or acid anhydride being ten mols). The resulting unsaturated polyester can be dissolved in styrene so that the resulting solution contains from 20 to 50 parts by weight of the styrene.

B. Epoxy resins likewise can be utilized in the formulation of the present laminated articles.

Where filled thermosetting resinous compositions are employed, there may be some difficulty in impregnating the foamed resin sheets with the filled thermosetting resinous composition because of the tendency of the filler particles to clog the pores of the foamed resin sheets. Fillers such as calcium carbonate and pigmenting substances will occasionally clog the smaller pores of the foamed resin sheets. Where the filler particles are finely comminuted, some bridging of particles in the pores of the foamed resin sheets may occur. The clogging phenomenon can be avoided by providing exceptionally finely comminuted filler substances. Alternatively the clogging phenomenon can be avoided by initially impregnating the foamed resin sheet or sheets with a clear (i.e., unfilled) thermosetting resinous composition prior to the application of the filled resin. The clear thermosetting resinous composition will prevent the appearance of the unconfined foamed resin material at the surface layers.

I claim:

1. A substantially non-porous laminated article comprising a resilient sheet of flexible foamed polyurethane having open, connected cells, said laminated article having its open cells substantially entirely filled with a thermosetting resinous composition in a hardened, thermoset condition, the said thermosetting resinous composition having been cured while the said foamed polyurethane was maintained under compression whereby the said foamed polyurethane is substantially flattened from its initial uncompressed thickness and is substantially uniformly disposed throughout the said article.

2. The laminated article of claim 1 wherein the said thermosetting resinous composition is a flexible unsaturated polyester resinous composition.

3. The laminated article of claim 1 wherein the said foamed polyurethane sheet has open, connected cells of average uniform cell diameter in the range of 0.001 to 0.5 inch.

4. The laminated article of claim 3 wherein the said foamed polyurethane sheet has a thickness of from 0.05 to 2.0 inches in its normal uncompressed form.

5. The laminated article of claim 1 wherein a plurality of layers of foamed polyurethane are utilized in a sandwich assembly.

6. The laminated article of claim 1 wherein the said thermosetting resinous composition is substantially free of opaque fillers.

7. The method of preparing a substantially non-porous laminated article which comprises impregnating a resilient sheet of flexible foamed polyurethane having open, connected cells with a thermosetting resinous composition in liquid form, compressing the said foamed polyurethane sheet thus impregnated between molding plates whereby the said foamed polyurethane is in abutment with the said molding plates and whereby the said resinous composition substantially entirely fills the open cells of the said sheet in its compressed condition, curing the said thermosetting resinous composition to a thermoset condition while maintaining the said sheet of foamed polyurethane under compression between the said molding plates, and thereafter separating the said molding plates and recovering a laminated article containing the said polyurethane sheet substantially flattened from its initial uncompressed thickness and substantially uniformly disposed throughout the said article.

8. The method of claim 7 wherein the said thermosetting resinous composition is a flexible unsaturated polyester resinous composition.

9. The method of claim 7 wherein the said foamed polyurethane sheet has open, connected cells of substantially uniform average diameter in the range of 0.001 to 0.5 inch.

10. The method of claim 9 wherein the said foamed polyurethane has a normal, uncompressed thickness in the range of 0.05 to 2.0 inches.

11. The method of claim 7 wherein a plurality of sheets of foamed polyurethane are assembled in a sandwich assembly and compressed between the said molding plates.

References Cited by the Examiner
UNITED STATES PATENTS

| | | | |
|---|---|---|---|
| Re. 20,029 | 7/36 | Fischer | 156—62.8 X |
| 2,744,047 | 5/56 | Ingrassia et al. | 156—311 |
| 2,782,458 | 2/57 | Emmert et al. | 156—313 X |
| 2,866,730 | 12/58 | Potchen et al. | 154—45.9 |
| 2,905,580 | 9/59 | Kreir | 161—413 X |
| 2,927,876 | 3/60 | Hoppe et al. | 161—159 X |
| 2,994,110 | 8/61 | Hardy | 18—59 |
| 3,018,206 | 1/62 | Hood et al. | 161—205 |
| 3,050,414 | 8/62 | Reilly | 117—98 |

EARL M. BERGERT, *Primary Examiner.*